US011831154B2

(12) United States Patent
Chen et al.

(10) Patent No.: US 11,831,154 B2
(45) Date of Patent: Nov. 28, 2023

(54) VOLTAGE BALANCE CIRCUIT AND A METHOD FOR BALANCING A CHARGING VOLTAGE OF THE VOLTAGE BALANCE CIRCUIT

(71) Applicants: Cheng Uei Precision Industry Co., Ltd., New Taipei (TW); Foxlink Automotive Technology(Kunshan) Co., Ltd., Kun Shan (CN); Foxlink Automotive Technology Co., Ltd., New Taipei (TW)

(72) Inventors: Po Shen Chen, New Taipei (TW); Hao Chiang, New Taipei (TW); Jui Chan Yang, New Taipei (TW); Ming Chun Chang, New Taipei (TW); Tsai Fu Lin, New Taipei (TW)

(73) Assignees: Cheng Uel Precision Industry Co., Ltd., New Taipel (TW); Foxlink Automotive Technology(Kunshan) Co., Ltd., Kun Shan (CN); Foxlink Automotive Technology Co., Ltd., New Taipel (TW)

( * ) Notice: Subject to any disclaimer, the term of this patent is extended or adjusted under 35 U.S.C. 154(b) by 395 days.

(21) Appl. No.: 17/374,800

(22) Filed: Jul. 13, 2021

(65) Prior Publication Data
US 2022/0181888 A1   Jun. 9, 2022

(30) Foreign Application Priority Data
Dec. 3, 2020   (CN) .......................... 202011394870.3

(51) Int. Cl.
*H02J 7/00*   (2006.01)
*H01M 10/42*   (2006.01)
*H01M 10/44*   (2006.01)

(52) U.S. Cl.
CPC ......... *H02J 7/0014* (2013.01); *H01M 10/425* (2013.01); *H01M 10/441* (2013.01); *H01M 2010/4271* (2013.01); *H01M 2200/10* (2013.01)

(58) Field of Classification Search
USPC ........................................ 320/116–122, 137
See application file for complete search history.

(56) References Cited

U.S. PATENT DOCUMENTS 9,024,586 B2 * 5/2015 Vance ................... B60L 3/0046
320/122
2011/0316483 A1 * 12/2011 Zhang ................. H01M 10/486
320/118

(Continued)

FOREIGN PATENT DOCUMENTS

| TW | 201203779 A | 1/2012 |
|---|---|---|
| TW | 201308832 A | 2/2013 |
| TW | 201509061 A | 3/2015 |

OTHER PUBLICATIONS

Taiwan Patent Office, Office Action, Patent Application No. TW109143698, dated Aug. 4, 2021, Taiwan.

*Primary Examiner* — Samuel Berhanu
(74) *Attorney, Agent, or Firm* — Lin & Associates Intellectual Property, Inc.

(57) ABSTRACT

A voltage balance circuit includes a battery module connected to an external power source, a voltage dividing module, a detection module and a control module. The battery module includes a plurality of batteries connected in series. The voltage dividing module includes a plurality of bleeder resistors. Each bleeder resistor is connected with one battery in parallel. The detection module includes a plurality of thermistors, fixation resistances and micro-controllers. Each thermistor is arranged beside one bleeder resistor. Each thermistor is connected with one fixation resistance in series.

(Continued)

Each micro-controller is connected with one thermistor and the one fixation resistance. The control module includes a plurality of switches and an analog front end component. Each switch is connected with the one bleeder resistor in series. Each switch is connected to the analog front end component, and the analog front end component is connected to the one micro-controller.

19 Claims, 10 Drawing Sheets

(56) References Cited

U.S. PATENT DOCUMENTS

| | | | | |
|---|---|---|---|---|
| 2012/0004873 | A1* | 1/2012 | Li | B60L 3/0046 |
| | | | | 320/134 |
| 2014/0225622 | A1* | 8/2014 | Kudo | B60L 7/14 |
| | | | | 324/433 |
| 2014/0306662 | A1* | 10/2014 | Kim | H02J 7/0016 |
| | | | | 320/118 |

* cited by examiner

FIG. 10 ent application is based on, and claims priority
VOLTAGE BALANCE CIRCUIT AND A METHOD FOR BALANCING A CHARGING VOLTAGE OF THE VOLTAGE BALANCE CIRCUIT

CROSS-REFERENCE TO RELATED APPLICATION

The present application is based on, and claims priority from, China Patent Application No. 202011394870.3, filed Dec. 3, 2020, the disclosure of which is hereby incorporated by reference herein in its entirety.

BACKGROUND OF THE INVENTION

1. Field of the Invention

The present invention generally relates to a voltage balance circuit and a method for balancing a charging voltage, and more particularly to a voltage balance circuit that is capable of immediately adjusting a charging voltage of each battery at the time of a plurality of batteries being charged simultaneously, and a method for balancing a charging voltage of the voltage balance circuit.

2. The Related Art

During a charging process of a conventional battery pack, the conventional battery pack includes a plurality of battery cells, if the conventional battery pack is without being equipped with a balancing function, when at least one battery cell is fully charged, the conventional battery pack is regarded to be fully charged in whole. However, in fact, some of the plurality of the battery cells of the conventional battery pack are without being fully charged. When the conventional battery pack is discharged and an electric quantity of the at least one battery cell is returned to zero, the conventional battery pack is regarded to be fully discharged, nevertheless, in fact, several of the plurality of the battery cells have been without being fully discharged. Therefore, a voltage balance management system needs to be added to the conventional battery pack to balance a voltage charging condition of each battery cell during a charging process.

In an existing voltage balance management system, each battery cell is connected with a bleeder resistor in parallel, in the charging process, each battery cell of the conventional battery pack with such a higher voltage is capable of being discharged by virtue of a partial voltage entering the bleeder resistor to reduce a voltage entering each battery cell.

However, when an electric current flows into the bleeder resistor, an electric energy is converted into a heat energy to be consumed, so a temperature of the bleeder resistor will continue rising. When the temperature is too high, other components are easily affected or damaged.

Therefore, it is necessary to provide an innovative voltage balance circuit that is capable of immediately adjusting a charging voltage of each battery at the time of a plurality of batteries being charged simultaneously, and the innovative voltage balance circuit is capable of immediately controlling a discharge status of a bleeder resistor, so that when the plurality of the batteries are charged, the plurality of the batteries are capable of continuously balancing a voltage and controlling a temperature of the bleeder resistor.

SUMMARY OF THE INVENTION

An object of the present invention is to provide a voltage balance circuit. The voltage balance circuit includes a battery module connected to an external power source for charging the battery module, a voltage dividing module, a detection module and a control module. The battery module includes a plurality of batteries connected in series. The voltage dividing module includes a plurality of bleeder resistors. Each bleeder resistor is connected with one battery in parallel. The detection module includes a plurality of thermistors, a plurality of fixation resistances and a plurality of micro-controllers. Each thermistor is arranged beside one bleeder resistor. Each thermistor is connected with one fixation resistance in series, and each fixation resistance is earthed. Each micro-controller is connected with one thermistor and the one fixation resistance. The control module includes a plurality of switches and an analog front end component. Each switch is connected with the one bleeder resistor in series, and each switch is connected with the one battery in parallel. Each switch is disconnected from the one bleeder resistor at the time of being without proceeding with a current division. Each switch is connected to the analog front end component, and the analog front end component is connected to the one micro-controller. The one micro-controller is able to instantly calculate a temperature value of each thermistor by a change of a resistance value of each thermistor, and temperature information of each thermistor is transmitted to the analog front end component, the analog front end component sets an upper temperature limit value and a lower temperature limit value. When the temperature value of each thermistor is lower than the lower temperature limit value, the analog front end component controls each switch, and each switch is connected to the one bleeder resistor. When the temperature value of each thermistor exceeds the upper temperature limit value, the analog front end component controls each switch, and each switch is disconnected from the one bleeder resistor.

Another object of the present invention is to provide a voltage balance circuit. The voltage balance circuit includes a first battery, at least one second battery connected with the first battery in series, a first bleeder resistor, at least one second bleeder resistor, a first MOSFET (Metal Oxide Semiconductor Field Effect Transistor) switch, at least one second MOSFET switch, an analog front end component, a first thermistor arranged beside the first bleeder resistor, a first fixation resistance connected to one end of the first thermistor, at least one second thermistor arranged beside the at least one second bleeder resistor, at least one second fixation resistance connected to one end of the at least one second thermistor, and at least one micro-controller. One end of the first bleeder resistor is connected to a positive electrode of the first battery. One end of the at least one second bleeder resistor is connected to a positive electrode of the at least one second battery and a negative electrode of the first battery. A drain electrode of the first MOSFET switch is connected to the other end of the first bleeder resistor. A source electrode of the first MOSFET switch is connected to the one end of the at least one second bleeder resistor. A drain electrode of the at least one second MOSFET switch is connected to the other end of the at least one second bleeder resistor, and a source electrode of the at least one second MOSFET switch is connected to a negative electrode of the at least one second battery. The analog front end component is connected to a gate electrode of the first MOSFET switch and a gate electrode of the at least one second MOSFET switch, respectively. The at least one micro-controller is connected to the one end of the first thermistor and the one end of the second thermistor respectively, the micro-controller is connected to the analog front end component.

Another object of the present invention is to provide a method for balancing a charging voltage of the voltage balance circuit. A plurality of batteries of the voltage balance circuit start being charged by use of the method for balancing the charging voltage of the voltage balance circuit. Specific steps of the method for balancing the charging voltage of the voltage balance circuit are described hereinafter. Detect a voltage condition of each battery. Send an instruction signal to one switch connected to one battery of which a voltage is higher than the lowest present voltage. Make the one switch and one bleeder resistor connected with the one battery in parallel be conductive, a partial voltage enters the one bleeder resistor, and the one bleeder resistor continues heating up. Continuously change a resistance value of one thermistor arranged beside the one bleeder resistor due to a continuous temperature change of the one bleeder resistor. Continuously calculate a temperature value of the one thermistor and continuously transmit the temperature value of the one thermistor to an analog front end component of the voltage balance circuit. Judge whether the temperature value of the one thermistor exceeds an upper temperature limit value set in the analog front end component, when the temperature value of the one thermistor exceeds the upper temperature limit value set in the analog front end component, the instruction signal is transmitted to the one switch to disconnect the one switch from the one bleeder resistor, and the one bleeder resistor starts cooling down. Judge whether the temperature value of the one thermistor is lower than a lower temperature limit value set in the analog front end component, when the temperature value of the one thermistor is lower than the lower temperature limit value set in the analog front end component and the voltage of the one battery is higher than the lowest present voltage, the analog front end component transmits the instruction signal to the one switch to make the one switch and the one bleeder resistor conductive, and the one bleeder resistor starts heating up. Repeat judging whether the temperature value of the one thermistor exceeds the upper temperature limit value set in the analog front end component and judging whether the temperature value of the one thermistor is lower than the lower temperature limit value set in the analog front end component so as to make the one bleeder resistor start cooling down or heating up until the plurality of the batteries are fully charged.

As described above, the voltage balance circuit is able to sense the temperature change of each bleeder resistor in real time and through each thermistor, and an on state between the plurality of the switches and the plurality of the bleeder resistors or an off state between the plurality of the switches and the plurality of the bleeder resistors are switched in the real time. In this way, the voltage condition of each battery is able to be continuously balanced, so that each battery in a low voltage state is able to be fully charged.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

With reference to FIG. 1 to FIG. 4, a voltage balance circuit 100, and a method for balancing a charging voltage of the voltage balance circuit 100 in accordance with a preferred embodiment of the present invention are shown. The method for balancing the charging voltage is applied to the voltage balance circuit 100. The voltage balance circuit 100 includes a battery module 1, a voltage dividing module 2, a detection module 3 and a control module 4.

Figure 1:
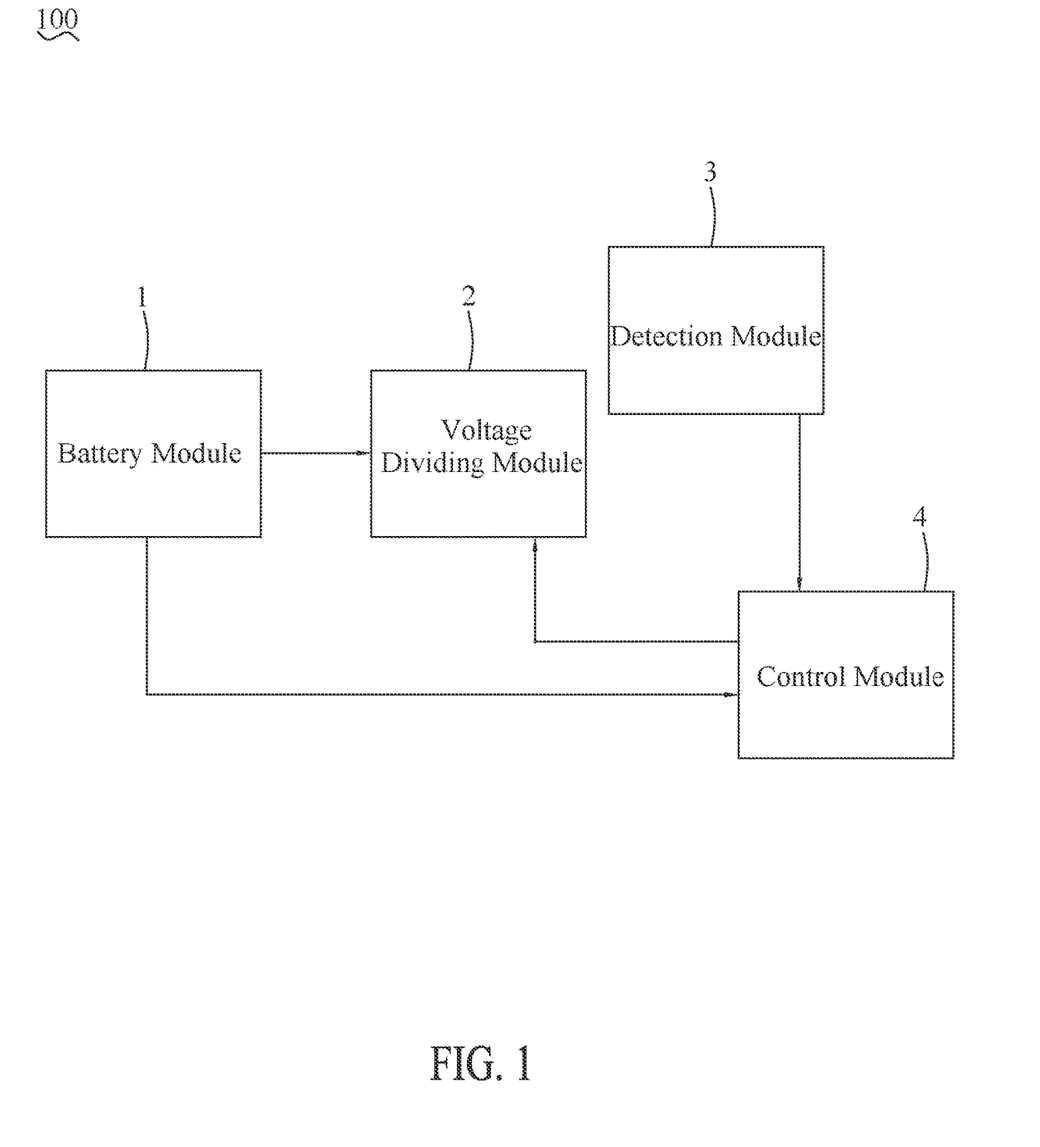
FIG. 1 is a system block diagram of a voltage balance circuit in accordance with a preferred embodiment of the present invention.
Figure 2:
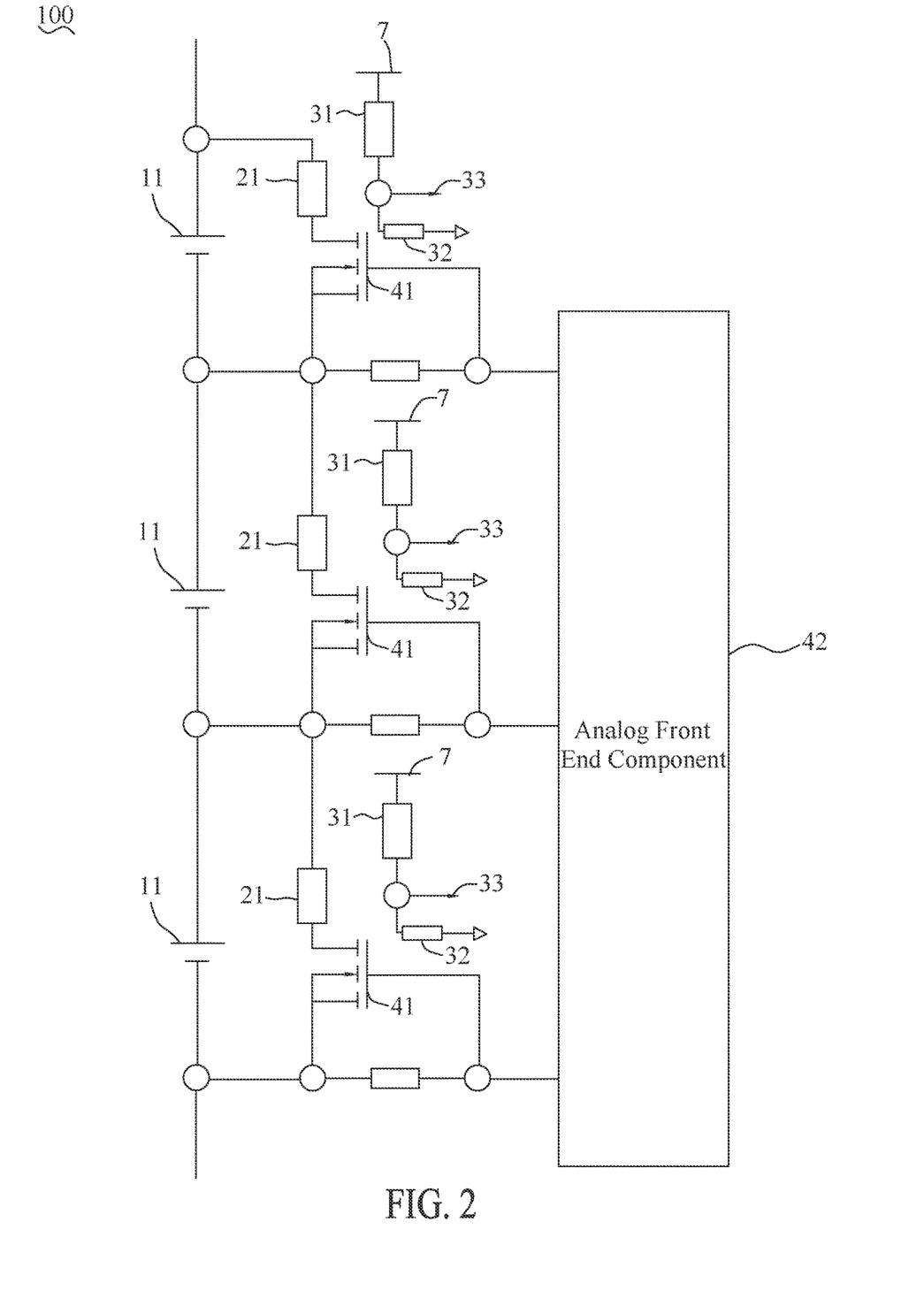
FIG. 2 is a circuit diagram of the voltage balance circuit in accordance with the preferred embodiment of the present invention.

The battery module 1 is connected to an external power source for charging the battery module 1. Preferably, the battery module 1 includes a plurality of batteries 11 connected in series.

Preferably, the voltage dividing module 2 includes a plurality of bleeder resistors 21. Each bleeder resistor 21 is connected with one battery 11 in parallel. The voltage dividing module 2 is capable of making current entering the plurality of the batteries 11 of the battery module 1 partially enter the plurality of the bleeder resistors 21. In this way, the current entering the battery module 1 is capable of being divided.

Figure 3:
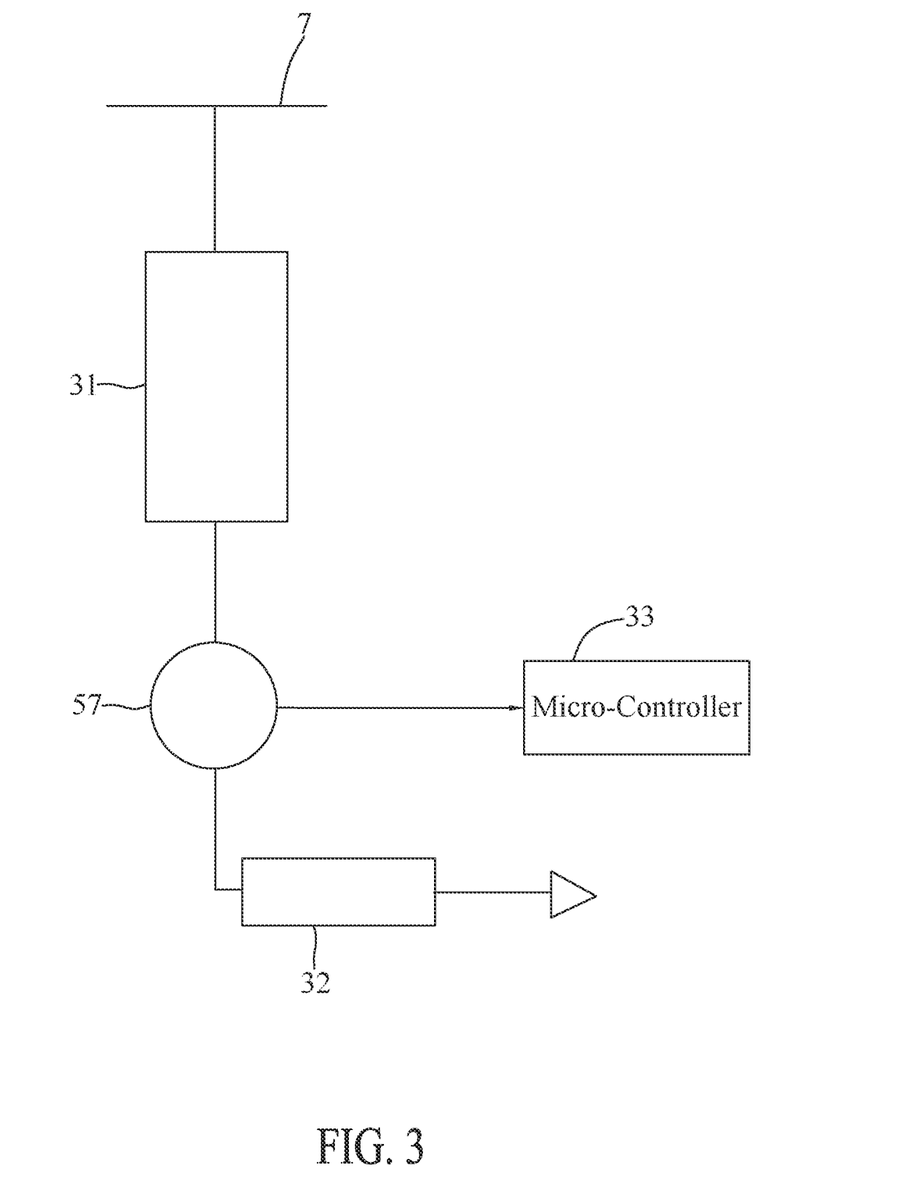
FIG. 3 is a circuit diagram of a detection module in the voltage balance circuit in accordance with the preferred embodiment of the present invention.

Preferably, the detection module 3 includes a plurality of thermistors 31, a plurality of fixation resistances 32 and a plurality of micro-controllers 33. The voltage balance circuit 100 further includes a plurality of internal power supplies 7. Each thermistor 31 is arranged beside one bleeder resistor 21 for sensing a temperature value change of the one bleeder resistor 21. Each thermistor 31 is connected with one fixation resistance 32 in series, and each fixation resistance 32 is earthed. Each micro-controller 33 is connected with one thermistor 31 in parallel, and each micro-controller 33 is connected with the one fixation resistance 32 in parallel for reading a voltage division value of each internal power supply 7 provided for the one thermistor 31 and the one fixation resistance 32 to obtain a temperature signal.

Each thermistor 31 has a characteristic of a resistance value of each thermistor 31 changing with temperature changes. Each fixation resistance 32 has a fixation resistance value. Each micro-controller 33 captures the voltage division value of one internal power supply 7 provided for each fixation resistance 32 and each thermistor 31 to calculate a temperature value of each thermistor 31. Specifically, because each fixation resistance 32 is the fixation resistance value, when the resistance value of each thermistor 31 changes with the temperature changes, the one micro-controller 33 is capable of instantly calculating the temperature value of each thermistor 31 by a change of the resistance value of each thermistor 31.

Preferably, the control module 4 includes a plurality of switches 41 and an analog front end (AFE) component 42. Each switch 41 is a MOSFET (Metal Oxide Semiconductor Field Effect Transistor) switch. Each switch 41 which is the MOSFET switch is capable of being turned on or turned off by receiving an instruction signal. Each switch 41 is connected with the one bleeder resistor 21 in series, and each switch 41 is connected with the one battery 11 in parallel. So that when a charging voltage enters the plurality of the batteries 11, a partial voltage enters each bleeder resistor 21. Ordinarily, each switch 41 is disconnected from the one bleeder resistor 21 at the time of being without proceeding with a current division. Therefore, usually, when each battery 11 is charged, each battery 11 is charged by a full charging current.

Each switch 41 is connected to the analog front end component 42, and the analog front end component 42 is connected to the one micro-controller 33. The one micro-controller 33 is able to instantly calculate the temperature value of each thermistor 31 by the change of the resistance value of each thermistor 31, and temperature information of each thermistor 31 is transmitted to the analog front end component 42. When the one micro-controller 33 calculates the temperature value of each thermistor 31, the temperature value of each thermistor 31 is transmitted to the analog front end component 42. The analog front end component 42 sets an upper temperature limit value and a lower temperature limit value. When a received temperature is lower than the lower temperature limit value and is conformed to an actuating balance device, each switch 41 is connected to the one bleeder resistor 21. When the received temperature exceeds the upper temperature limit value, each switch 41 is disconnected from the one bleeder resistor 21. When the temperature value of each thermistor 31 is lower than the lower temperature limit value and is conformed to actuate the voltage balance circuit 100, the analog front end component 42 controls each switch 41, each switch 41 is connected to the one bleeder resistor 21. When the temperature value of each thermistor 31 exceeds the upper temperature limit value, the analog front end component 42 controls each switch 41, each switch 41 is disconnected from the one bleeder resistor 21.

When the battery module 1 starts being charged, the analog front end component 42 will detect a voltage condition of each battery 11 to find out the battery 11 which is with the lowest present voltage. Then, the analog front end component 42 regards the battery 11 with the lowest present voltage as a standard, and when a voltage of one of the batteries 11 is higher than the lowest present voltage, the analog front end component 42 sends the instruction signal to the switch 41 which is connected to the battery 11 with the voltage higher than the lowest present voltage, so that the switch 41 which is connected to the battery 11 with the voltage higher than the lowest present voltage, and the one bleeder resistor 21 are conductive to divide the current of the one of the batteries 11. In this way, during a charging process, the battery 11 with the lowest present voltage is capable of getting the full charging current. The battery 11 with the voltage higher than the lowest present voltage generates that a partial current enters the one bleeder resistor 21 due to a conduction between the switch 41 which is connected to the battery 11 with the voltage higher than the lowest present voltage, and the one bleeder resistor 21, so that a lower charging current is obtained, and a voltage of each battery 11 is gradually balanced to avoid a situation that the battery 11 with the lowest present voltage has no way of being fully charged at the time of the plurality of the batteries 11 being charged simultaneously.

When the current flows through each bleeder resistor 21, each bleeder resistor 21 converts an electrical energy into a heat energy exhaustion, so that each bleeder resistor 21 continues heating up to make a temperature of each bleeder resistor 21 continuously rising. If the temperature of each bleeder resistor 21 is too high, other components will be affected.

Therefore, each thermistor 31 is arranged beside the one bleeder resistor 21. When the temperature of each bleeder resistor 21 rises, the temperature of each bleeder resistor 21 is conducted to one thermistor 31, so that the resistance value of each thermistor 31 changes on account of each thermistor 31 being heated. Each micro-controller 33 continues calculating the voltage division value of the one internal power supply 7 provided for each thermistor 31 and each fixation resistance 32 to obtain the temperature value of each thermistor 31, and the temperature value of each thermistor 31 is continuously transmitted to the analog front end component 42 by the temperature signal. The analog front end component 42 determines whether the temperature value of each thermistor 31 exceeds the set upper temperature limit value. When the temperature value of each thermistor 31 exceeds the upper temperature limit value, the instruction signal is transmitted to each switch 41 to disconnect each switch 41 from the one bleeder resistor 21 to stop the current division. At the moment, the partial current is incapable of entering each bleeder resistor 21, the current flowing into each battery 11 is returned fully, and each bleeder resistor 21 starts cooling down.

When the temperature of each bleeder resistor 21 starts cooling down, the resistance value of each thermistor 31 is affected by a temperature drop of each bleeder resistor 21 and is changed by the temperature drop of each bleeder resistor 21. Each micro-controller 33 continues calculating the voltage division value of the one internal power supply 7 provided for each thermistor 31 and each fixation resistance 32 to obtain the temperature value of each thermistor 31, and the temperature value of each thermistor 31 is continuously transmitted to the analog front end component 42 by the temperature signal. The analog front end component 42 then determines whether the temperature value of each thermistor 31 is lower than the lower temperature limit value. When the temperature value of each thermistor 31 is lower than the lower temperature limit value and the voltage of each battery 11 is higher than the lowest present voltage of the battery 11, the instruction signal is sent to each switch 41 to make each switch 41 and the one bleeder resistor 21 be conductive. At the moment, the partial current will enter each bleeder resistor 21 for proceeding with the current division, and each bleeder resistor 21 will begin heating up. In this way, the voltage condition of each battery 11 is capable of being continuously balanced, so the battery 11 in a low voltage status is capable of being fully charged.

With reference to FIG. 1 to FIG. 10, the plurality of the batteries 11 of the voltage balance circuit 100 start being charged by use of the method for balancing the charging voltage of the voltage balance circuit 100. The method for balancing the charging voltage of the voltage balance circuit 100 includes following steps.

Figure 10:
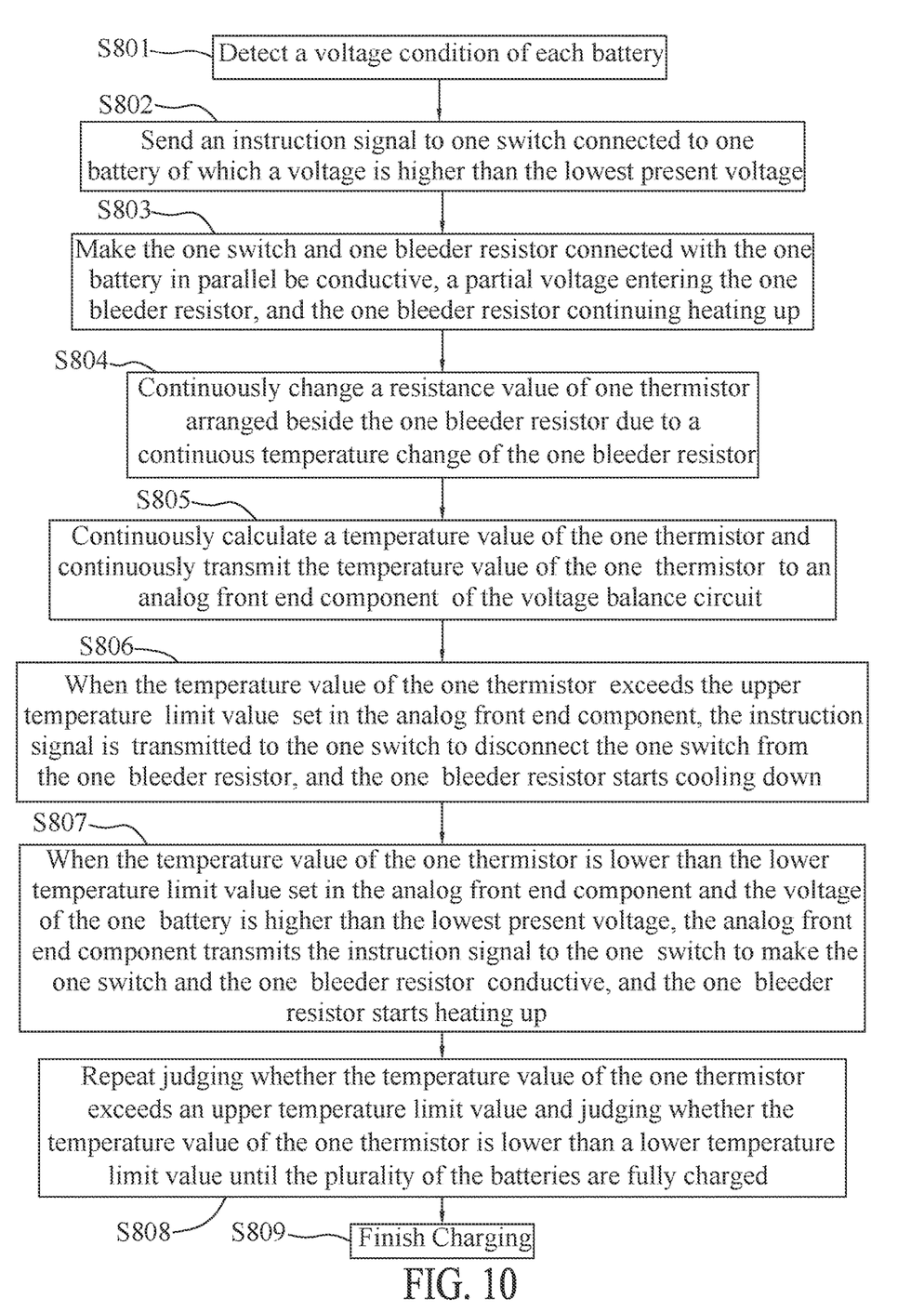
FIG. 10 is a flow chart of a method for balancing a charging voltage of the voltage balance circuit at the time of charging a plurality of batteries according to the preferred embodiment of the present invention.

S801: the analog front end component 42 detects the voltage condition of each battery 11.

S802: the analog front end component 42 sends the instruction signal to one switch 41 connected to one battery 11 of which the voltage is higher than the lowest present voltage. The one switch 41 is connected with the one bleeder resistor 21 in series. The one battery 11 is connected with the one switch 41 and the one bleeder resistor 21 in parallel. The one thermistor 31 is arranged beside the one bleeder resistor 21. The one micro-controller 33 is connected with the thermistor 31 in parallel.

S803: make the one switch 41 and the one bleeder resistor 21 connected with the one battery 11 in parallel be conductive, the partial voltage enters the one bleeder resistor 21 connected with the one battery 11 in parallel, and the one bleeder resistor 21 connected with the one battery 11 in parallel continues heating up.

S804: continuously change a resistance value of the one thermistor 31 arranged beside the one bleeder resistor 21 which is connected with the one battery 11 in parallel due to a continuous temperature change of the one bleeder resistor 21 connected with the one battery 11 in parallel.

S805: the one micro-controller 33 connected with the one thermistor 31 in parallel continuously calculates a temperature value of the one thermistor 31 and continuously transmits the temperature value of the one thermistor 31 to the analog front end component 42 of the voltage balance circuit 100.

S806: judge whether the temperature value of the one thermistor 31 exceeds the upper temperature limit value set in the analog front end component 42, when the temperature value of the one thermistor 31 exceeds the upper temperature limit value set in the analog front end component 42, the instruction signal is transmitted to the one switch 41 to disconnect the one switch 41 from the one bleeder resistor 21, and the one bleeder resistor 21 starts cooling down.

S807: judge whether the temperature value of the one thermistor 31 is lower than the lower temperature limit value set in the analog front end component 42, when the temperature value of the one thermistor 31 is lower than the lower temperature limit value set in the analog front end component 42 and the voltage of the one battery 11 is higher than the lowest present voltage of the battery 11, the analog front end component 42 transmits the instruction signal to the one switch 41 connected to the one battery 11 of which the voltage is higher than the lowest present voltage to make the one switch 41 and the one bleeder resistor 21 conductive, and the one bleeder resistor 21 starts heating up.

S808: before the plurality of batteries 11 are fully charged, continue repeating the step S806 and the step S807, repeat judging whether the temperature value of the one thermistor 31 exceeds the upper temperature limit value set in the analog front end component 42 and judging whether the temperature value of the one thermistor 31 is lower than the lower temperature limit value set in the analog front end component 42 so as to make the one bleeder resistor 21 start cooling down or heating up until the plurality of the batteries 11 are fully charged.

S809: finish charging.

When the step S807 of judging whether the temperature value of the one thermistor 31 is lower than the lower temperature limit value set in the analog front end component 42 is executed, if the temperature value of the one thermistor 31 is lower than the upper temperature limit value set in the analog front end component 42 and the voltage of the one battery 11 is equal to the lowest present voltage of the battery 11, the analog front end component 42 will be without transmitting the instruction signal to the one switch 41 to proceed with a conduction.

Figure 4:
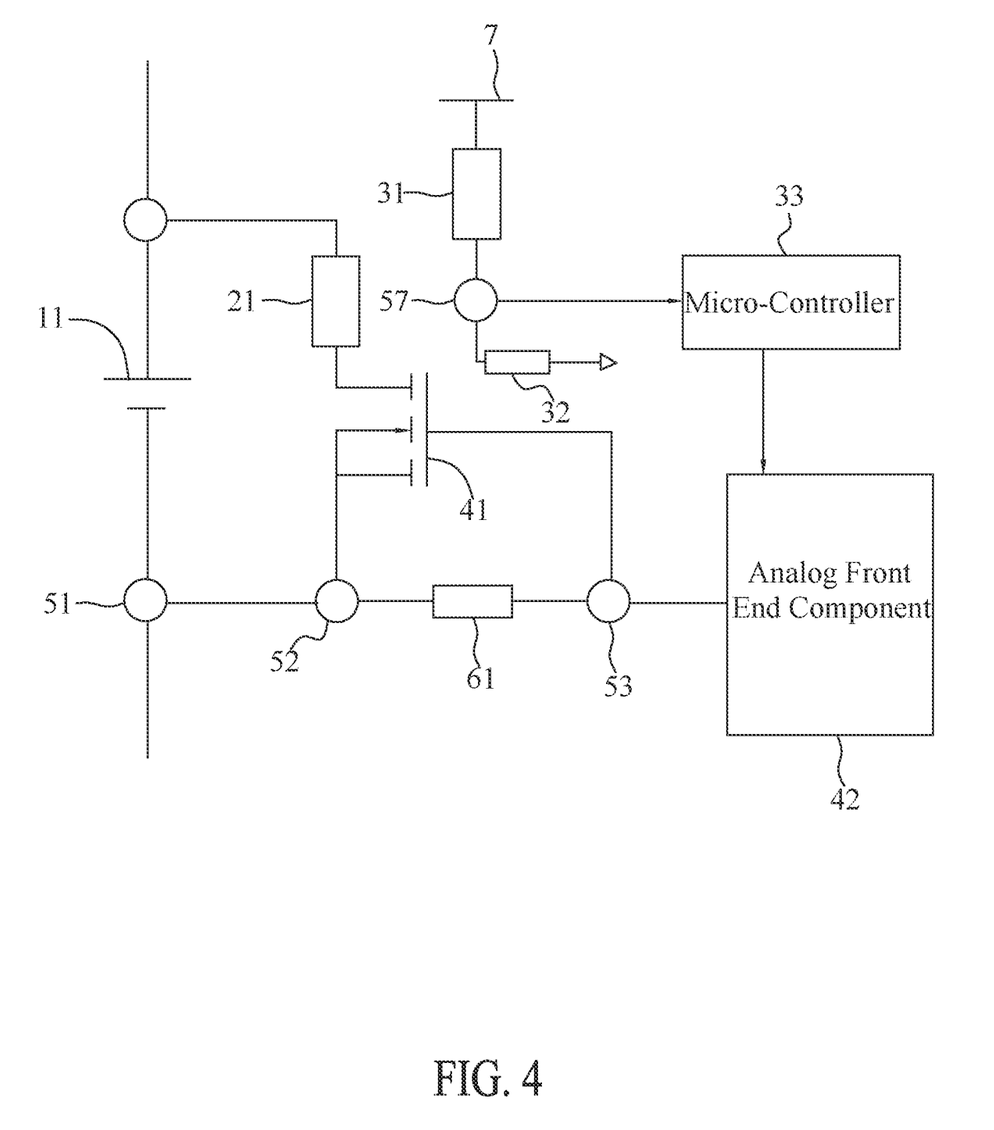
FIG. 4 is a partial circuit diagram of the voltage balance circuit in accordance with the preferred embodiment of the present invention.
Figure 5:
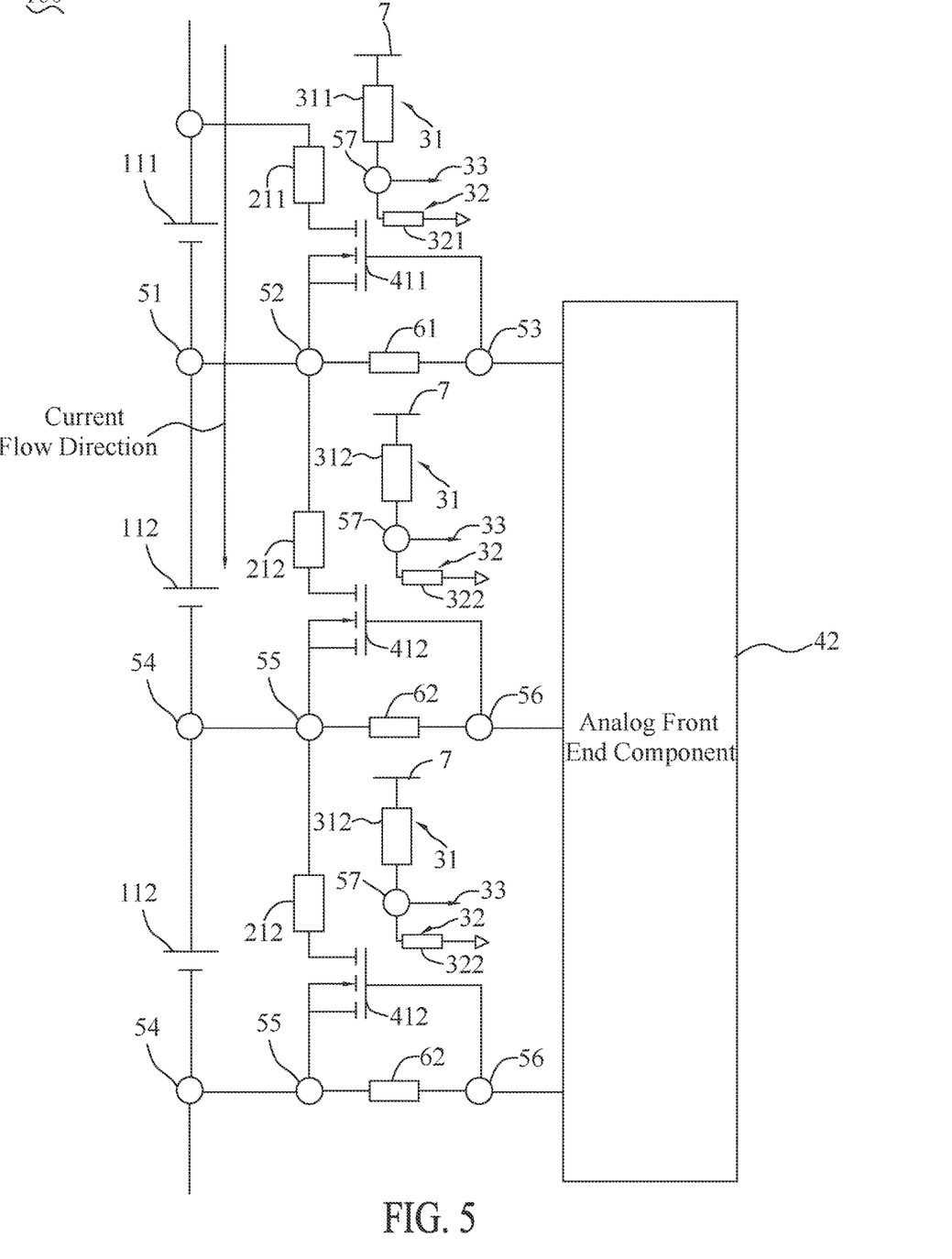
FIG. 5 is a circuit diagram of the voltage balance circuit showing a current flow direction of the voltage balance circuit, wherein a first switch and a second switch are both in off states and are in the voltage balance circuit according to the preferred embodiment of the present invention.

With reference to FIG. 3 to FIG. 5, the plurality of the batteries 11 include a first battery 111 and two second batteries 112. The plurality of the bleeder resistors 21 include a first bleeder resistor 211 and two second bleeder resistors 212. The plurality of the switches 41 include a first switch 411 and two second switches 412. The first switch 411 is a first MOSFET (Metal Oxide Semiconductor Field Effect Transistor) switch, and each second switch 412 is a second MOSFET (Metal Oxide Semiconductor Field Effect Transistor) switch. Each second battery 112 is connected with the first battery 111 in series. One end of the first bleeder resistor 211 is connected to a positive electrode of the first battery 111. One end of each second bleeder resistor 212 is connected to a positive electrode of one of the two second batteries 112 and a negative electrode of the first battery 111. The other end of each second bleeder resistor 212 is connected to a drain electrode of one of the two second MOSFET switches, and a negative electrode of each second battery 112 is connected to a source electrode of the one of the two second MOSFET switches.

In the preferred embodiment, the voltage balance circuit 100 includes at least two batteries 11 connected in series, at least two bleeder resistors 21, at least two switches 41, at least two thermistors 31, at least two fixation resistances 32, at least one micro-controller 33 and an internal power supply 7. The at least two batteries 11 are divided into the first battery 111 and at least one second battery 112. The at least one second battery 112 is connected with the first battery 111 in series. The at least two bleeder resistors 21 are divided into the first bleeder resistor 211 and at least one second bleeder resistor 212. One end of the at least one second bleeder resistor 212 is connected to a positive electrode of the at least one second battery 112 and the negative electrode of the first battery 111. A drain electrode of the second MOSFET switch is connected to the other end of the at least one second bleeder resistor 212, and a source electrode of the second MOSFET switch is connected to a negative electrode of the at least one second battery 112.

The at least two thermistors 31 are divided into a first thermistor 311 and at least one second thermistor 312. The first thermistor 311 is arranged beside the first bleeder resistor 211. The at least one second thermistor 312 is arranged beside the at least one second bleeder resistor 212. The at least two fixation resistances 32 include a first fixation resistance 321 and at least one second fixation resistance 322. The first fixation resistance 321 is connected to one end of the first thermistor 311. The second fixation resistance 322 is connected to one end of the second thermistor 312.

The at least two switches 41 are divided into the first switch 411 and at least one second switch 412. The at least one second switch 412 is at least one second MOSFET (Metal Oxide Semiconductor Field Effect Transistor) switch. A drain electrode of the first MOSFET switch is connected to the other end of the first bleeder resistor 211, and a source electrode of the first MOSFET is connected to the one end of the at least one second bleeder resistor 212. A drain electrode of the at least one second MOSFET switch is connected to the other end of the at least one second bleeder resistor 212, and a source electrode of the at least one second MOSFET switch is connected to a negative electrode of the at least one second battery 112. The analog front end component 42 is connected to a gate electrode of the first MOSFET switch and a gate electrode of the at least one second MOSFET switch, respectively. The at least one micro-controller 33 is connected to the one end of the first thermistor 311 and the one end of the second thermistor 312, respectively. The at least one micro-controller 33 is connected to the analog front end component 42. The first fixation resistance 321 is interconnected with the source electrode of the first MOSFET switch and the gate electrode of the first MOSFET switch. The second fixation resistance 322 is interconnected with the source electrode of the second MOSFET switch and the gate electrode of the second MOSFET switch.

The first battery 111 is connected with the first bleeder resistor 211 in parallel. The first switch 411 which is the first MOSFET switch is provided between the first bleeder resistor 211 and the first battery 111. The first battery 111, the first bleeder resistor 211 and the first switch 411 which is the first MOSFET switch are connected to form a switchable current division circuit loop. The first switch 411 is connected to the analog front end component 42. The at least one second battery 112 is connected with the at least one second bleeder resistor 212 in parallel.

The voltage balance circuit 100 has a first node 51, a second node 52, a third node 53, at least one fourth node 54 opposite to the first node 51, at least one fifth node 55 opposite to the second node 52, and at least one sixth node 56 opposite to the third node 53. The negative electrode of the first battery 111 is connected to the first node 51, the second node 52 is connected between the first node 51 and the first switch 411, and the third node 53 is connected between the second node 52 and the analog front end component 42. The first switch 411 is connected to the third node 53. The first switch 411 is connected with the third node 53 along an extension circuit. The voltage balance circuit 100 further includes at least one first resistor 61 connected between the second node 52 and the third node 53. The at least one first resistor 61 has a function of stabilizing a signal transmission between the analog front end component 42 and the first switch 411.

The first bleeder resistor 211 is capable of making the voltage balance circuit 100 generate a current division effect. When the first switch 411 is turned on, the first switch 411, the first bleeder resistor 211 and the second node 52 are connected to form a current division loop. When the first battery 111 is charged by the external power source, the current enters the first battery 111, and a part of the current enters the first bleeder resistor 211, so that the current flowing into the first battery 111 is able to be reduced. At the moment, the first bleeder resistor 211 is affected by a flow of the part of current and generates an heat energy, so that a temperature of the first bleeder resistor 211 rises.

When one second battery 112, one second bleeder resistor 212 and one second switch 412 which is the second MOSFET switch are provided, a composition and a connection way of the voltage balance circuit 100 are described as follows. The one second battery 112 is connected with the one second bleeder resistor 212 in parallel. The one second switch 412 which is the second MOSFET switch is provided between the one second bleeder resistor 212 and the one second battery 112. The one second battery 112, the one second bleeder resistor 212 and the one second switch 412 which is the second MOSFET switch are connected to form another switchable current division loop, and the one second switch 412 which is the second MOSFET switch is connected to the analog front end component 42.

A positive electrode of the one second battery 112 is connected to the first node 51, one end of the one second bleeder resistor 212 is connected to the second node 52, and the other end of the one second bleeder resistor 212 is connected to the one second switch 412. A negative electrode of the one second battery 112 is connected with one fourth node 54. One fifth node 55 is connected between the one fourth node 54 and the one second switch 412, and one sixth node 56 is connected between the one fifth node 55 and the analog front end component 42. The one sixth node 56 is connected to the one second switch 412. The one sixth node 56 is connected to the one second switch 412 along another extension circuit. The voltage balance circuit 100 further includes at least one second resistor 62 provided between the one fifth node 55 and the one sixth node 56. The second resistor 62 has a function of stabilizing a signal transmission between the analog front end component 42 and the one second switch 412.

In specific, when the two second batteries 112, the two second bleeder resistors 212 and the two second switches 412 are provided, the voltage balance circuit 100 has two fourth nodes 54 arranged longitudinally and opposite to the first node 51, two fifth nodes 55 arranged longitudinally and opposite to the second node 52, and two sixth nodes 56 abreast arranged opposite to the third node 53, a composition and a connection way of the voltage balance circuit 100 are substantially the same as the above-mentioned composition and the above-mentioned connection way of the voltage balance circuit 100 which includes the one second battery 112, one second bleeder resistor 212 and one second switch 412.

Each second battery 112 is connected with one of the second bleeder resistors 212 in parallel. Each second switch 412 is provided between the one of the second bleeder resistors 212 and one of the second batteries 112. Each second switch 412 is connected with the one of the second batteries 112 and the one of the second bleeder resistors 212 to form another switchable current division loop, and each second switch 412 is connected to the analog front end component 42.

Differences between the voltage balance circuit 100 which includes the one second battery 112, the one second bleeder resistor 212 and the one second switch 412, and the voltage balance circuit 100 which includes the two second batteries 112, the two second bleeder resistors 212 and the two second switches 412 are described as follows. A positive electrode of the newly added second battery 112 different from the one of the second batteries 112 is connected to the one fourth node 54. The newly added second bleeder resistor 212 different from the one of the second bleeder resistors 212 is connected to the one fifth node 55.

When a plurality of the second batteries 112, a plurality of the second bleeder resistors 212 and a plurality of the second switches 412 are provided, a composition and a connection way of the voltage balance circuit 100 which includes the plurality of the second batteries 112, the plurality of the second bleeder resistors 212 and the plurality of the second switches 412 are the same as the above-mentioned composition and the above-mentioned connection way of the voltage balance circuit 100 which includes the two second batteries 112, the two second bleeder resistors 212 and the two second switches 412.

The at least two thermistors 31 are disposed beside the first bleeder resistor 211 and the at least one second bleeder resistor 212. The voltage balance circuit 100 has at least two seventh nodes 57. One end of each thermistor 31 is connected to one internal power supply 7, and the other end of each thermistor 31 is connected to one seventh node 57. The one seventh node 57 is connected to one micro-controller 33. The one seventh node 57 is connected to the one micro-controller 33 along one more extension circuit. The one seventh node 57 is connected to one end of one fixation resistance 32. The one seventh node 57 is connected to the one end of the one fixation resistance 32 along another one extension circuit. The other end of the one fixation resistance 32 is earthed.

With reference to FIG. 5, ordinarily, the first switch 411 and the first bleeder resistor 211 are in an off state, and the at least one second bleeder resistor 212 and the at least one second switch 412 are in another off state, so that each circuit division loop is non-conducting. At the moment, the charging current only flows through the first battery 111 and the at least one second battery 112 which are connected in series for charging.

Figure 6:
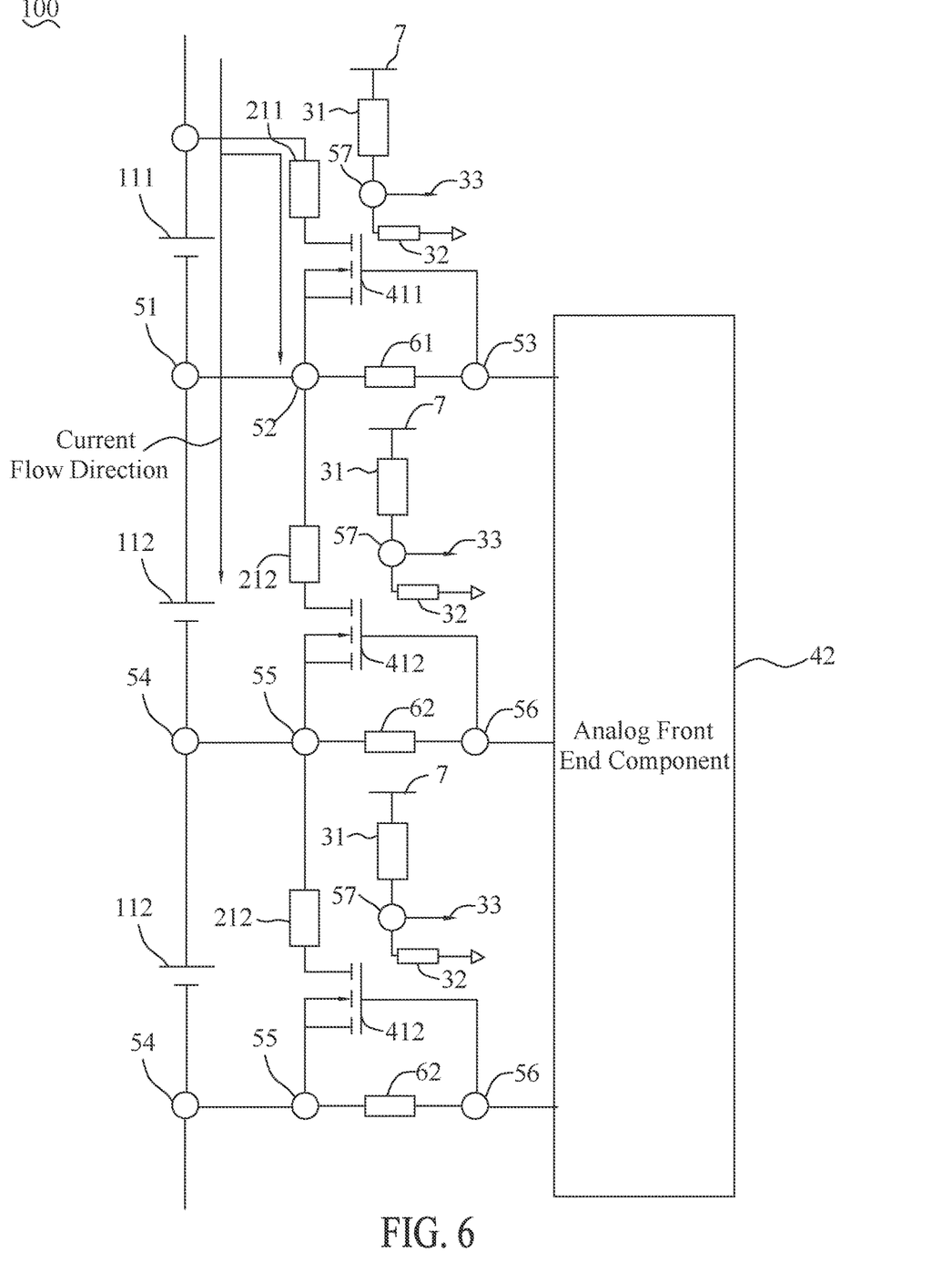
FIG. 6 is a circuit diagram of the voltage balance circuit showing the current flow direction of the voltage balance circuit, wherein the first switch is in an on status and is in the voltage balance circuit according to the preferred embodiment of the present invention.

With reference to FIG. 6, when the first switch 411 and the first bleeder resistor 211 are in a conductive state, the first bleeder resistor 211, the first switch 411 and the first battery 111 are connected in parallel. At the moment, the charging current not only enters the first battery 111, but also enters into the first bleeder resistor 211 partially, so that the charging current flowing into the first battery 111 is able to be reduced to make the first battery 111 charged with the lower charging current.

Figure 7:
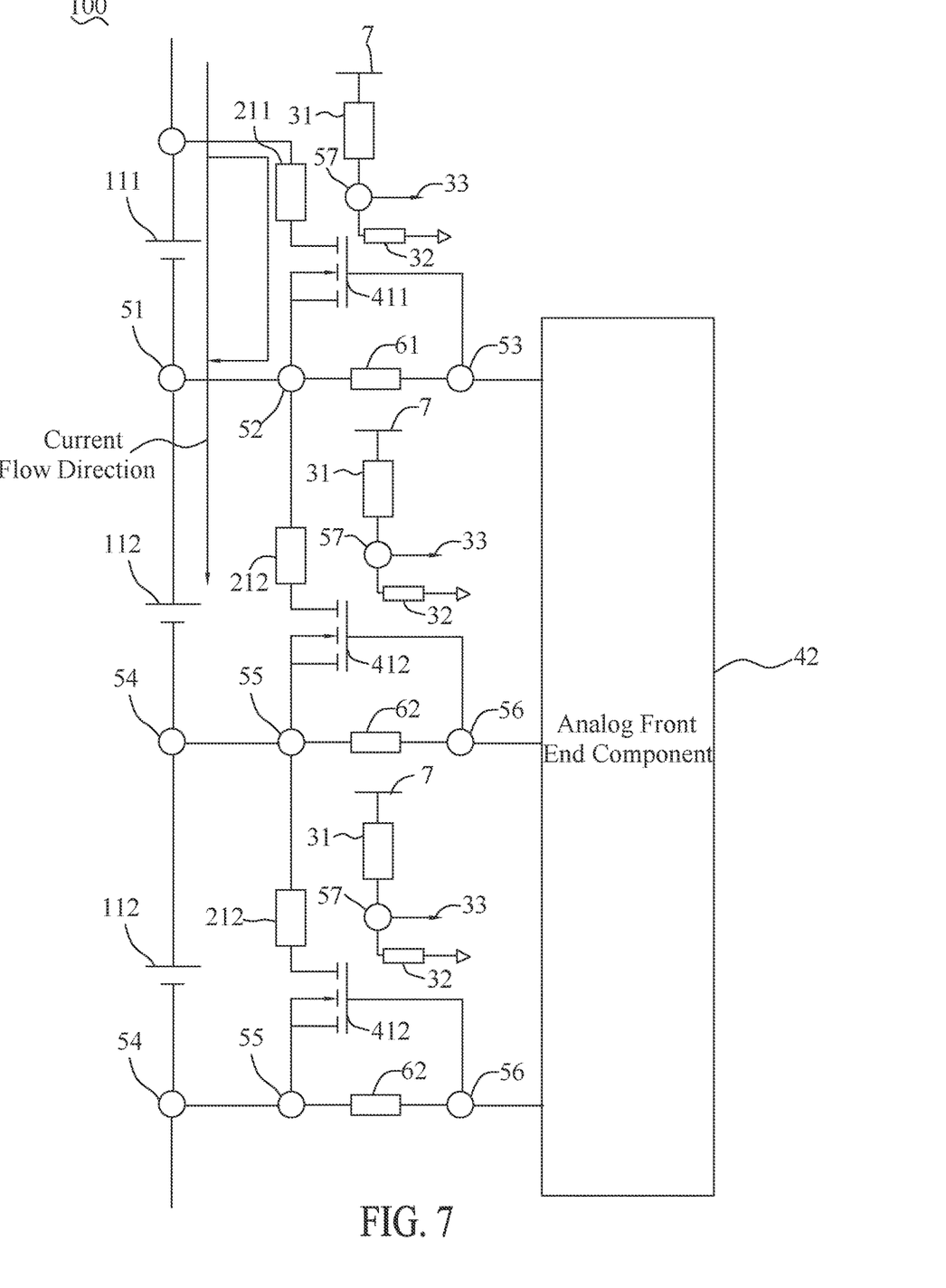
FIG. 7 is a circuit diagram of the voltage balance circuit showing the current flow direction of the voltage balance circuit, wherein the first switch is in the on status and the second switch is in the off status, and the first switch and the second switch are in the voltage balance circuit according to the preferred embodiment of the present invention.

With reference to FIG. 7, when the at least one second switch 412 is disconnected from the at least one second bleeder resistor 212, the part of the current flowing to the first bleeder resistor 211 sequentially passes through the first bleeder resistor 211, the first switch 411, the second node 52 and the first node 51, and the part of the current flowing to the first bleeder resistor 211 and most of the current flowing through the first battery 111 are collected at the first node 51, then the collected part of the current flowing to the first bleeder resistor 211 and the most of the current flowing through the first battery 111 enters the at least one second battery 112. The most of the current flowing through the first battery 111 enters an electric circuit of the at least one second battery 112. At the moment, the at least one second battery 112 receives the full charging current for being charged.

Figure 8:
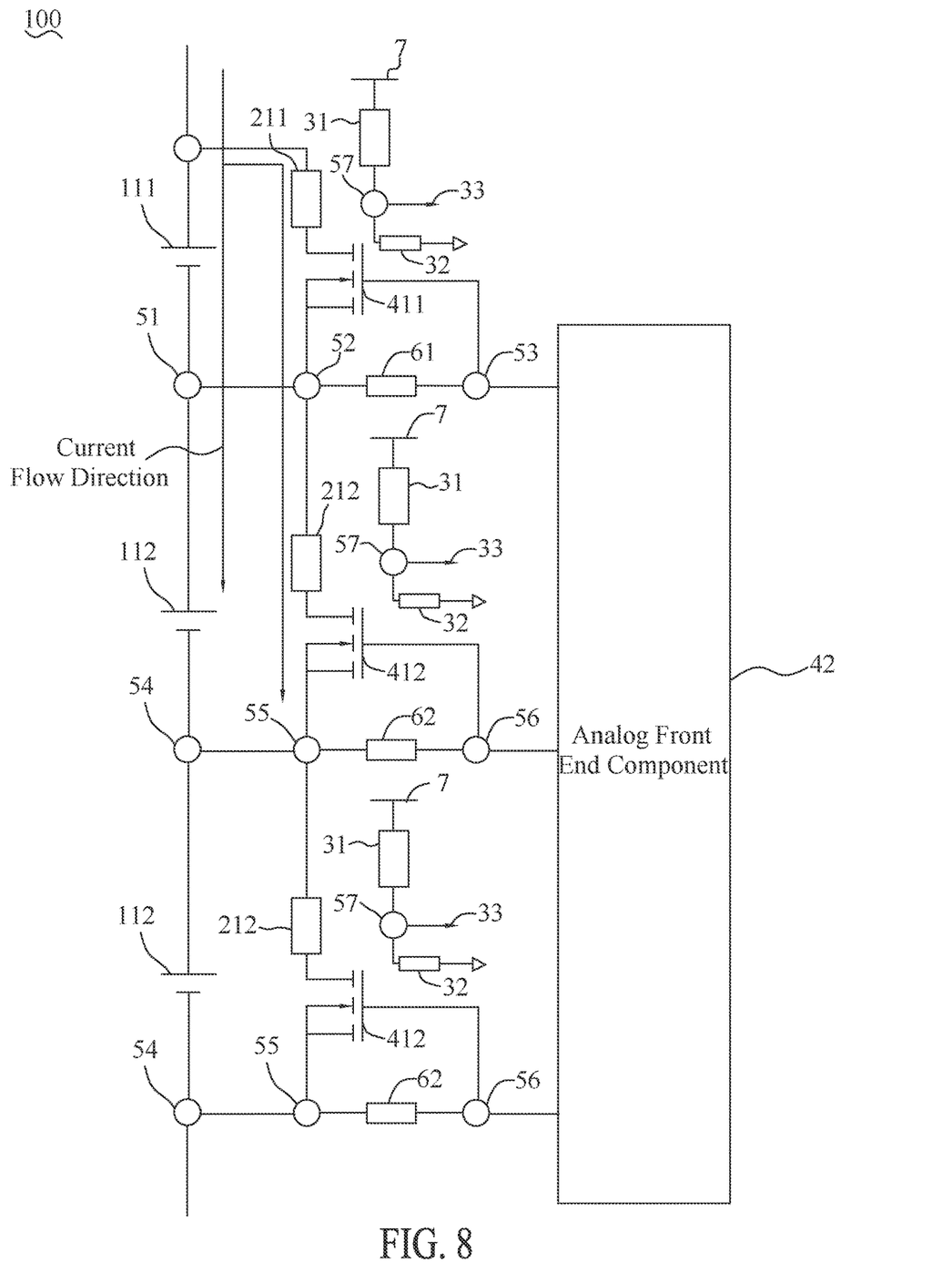
FIG. 8 is a circuit diagram of the voltage balance circuit showing the current flow direction of the voltage balance circuit, wherein the first switch and the second switch are both in on statuses and are in the voltage balance circuit according to the preferred embodiment of the present invention.

With reference to FIG. 8, when the at least one second switch 412 is connected to the at least one second bleeder resistor 212, the partial voltage that enters the first bleeder resistor 211 of the at least two bleeder resistors 21 passes through the first bleeder resistor 211, the first switch 411 and the second node 52 in sequence, and then enters the at least one second bleeder resistor 212 and the at least one second switch 412 in sequence. The most of the current flowing through the first battery 111 enters the at least one second battery 112 after the most of the current flowing through the first battery 111 passes through the first node 51.

With reference to FIG. 5, when the first switch 411 is disconnected from the first bleeder resistor 211, the charging current fully enters into the first battery 111 for proceeding with a full voltage charging. The full charging voltage enters the at least one second battery 112 through the first node 51. If the at least one second switch 412 is disconnected from the at least one second bleeder resistor 212, the charging current fully enters the at least one second battery 112 for proceeding with the full voltage charging.

Figure 9:
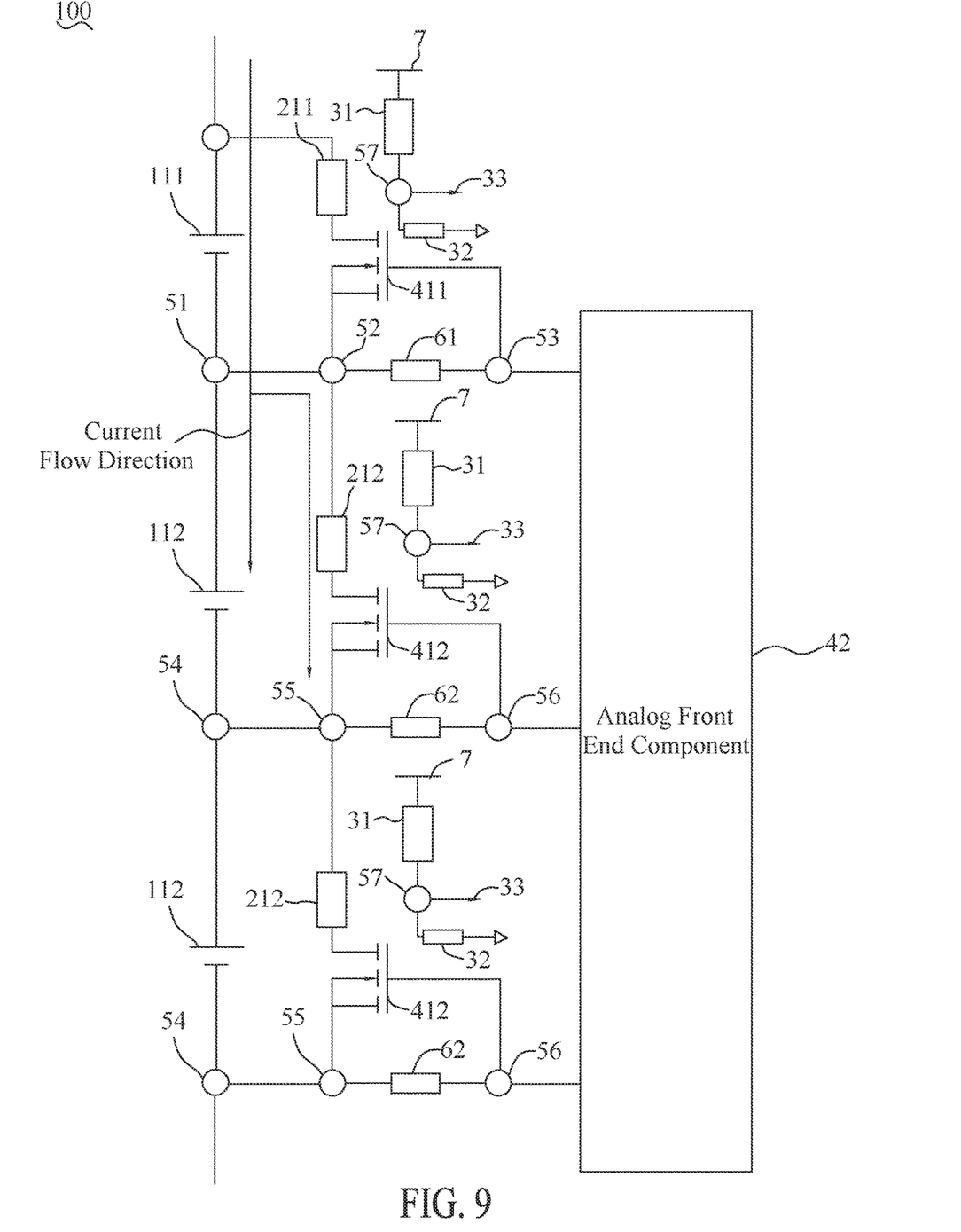
FIG. 9 is a circuit diagram of the voltage balance circuit showing the current flow direction of the voltage balance circuit, wherein the first switch is in the off status and the second switch is in the on status, and the first switch and the second switch are in the voltage balance circuit according to the preferred embodiment of the present invention.

With reference to FIG. 9, if the at least one second switch 412 and the at least one second bleeder resistor 212 are in an on state, the at least one second bleeder resistor 212 and the at least one second switch 412, and the at least one second battery 112 are connected in parallel, at the moment, the charging current not only enters the at least one second battery 112, but also enters the at least one second bleeder resistor 212 partially, so that the charging current entering the at least one second battery 112 is reduced to make the at least one second battery 112 charged with the lower charging current.

When a plurality of the second batteries 112, a plurality of the second bleeder resistors 212 and a plurality of the second switches 412 are provided, the plurality of the second switches 412 and the plurality of the second bleeder resistors 212 are in off statuses or in on statuses, a current flow way of the voltage balance circuit 100 including the plurality of the second batteries 112, the second bleeder resistors 212 and the second switches 412 is the same as a current flow way of the above-mentioned voltage balance circuit 100 including the at least one second battery 112, the at least one second bleeder resistor 212 and the at least one second switch 412.

As described above, the voltage balance circuit 100 is able to sense the temperature change of each bleeder resistor 21 in real time and through each thermistor 31, and an on state between the plurality of the switches 41 and the plurality of the bleeder resistors 21 or an off state between the plurality of the switches 41 and the plurality of the bleeder resistors 21 are switched in the real time. In this way, the voltage condition of each battery 11 is able to be continuously balanced, so that each battery 11 in a low voltage state is able to be fully charged.

What is claimed is:

1. A voltage balance circuit, comprising:
   a battery module connected to an external power source for charging the battery module, the battery module including a plurality of batteries connected in series;
   a voltage dividing module including a plurality of bleeder resistors, each bleeder resistor being connected with one battery in parallel;
   a detection module including a plurality of thermistors, a plurality of fixation resistances and a plurality of micro-controllers, each thermistor being arranged beside one bleeder resistor, each thermistor being connected with one fixation resistance in series, and each fixation resistance being earthed, each micro-controller being connected with one thermistor and the one fixation resistance; and
   a control module including a plurality of switches and an analog front end component, each switch being connected with the one bleeder resistor in series, and each switch being connected with the one battery in parallel, each switch being disconnected from the one bleeder resistor at the time of being without proceeding with a current division, each switch being connected to the analog front end component, and the analog front end component being connected to the one micro-controller, the one micro-controller being able to instantly calculate a temperature value of each thermistor by a change of a resistance value of each thermistor, and temperature information of each thermistor being transmitted to the analog front end component, the analog front end component setting an upper temperature limit value and a lower temperature limit value, wherein when the temperature value of each thermistor is lower than the lower temperature limit value, the analog front end component controls each switch, and each switch is connected to the one bleeder resistor, wherein when the temperature value of each thermistor exceeds the upper temperature limit value, the analog front end component controls each switch, and each switch is disconnected from the one bleeder resistor.

2. The voltage balance circuit as claimed in claim 1, wherein the plurality of the batteries include a first battery and two second batteries, the plurality of the bleeder resistors include a first bleeder resistor and two second bleeder resistors, the plurality of the switches include a first switch and two second switches, the first battery is connected with the first bleeder resistor in parallel, each second battery is connected with one of the second bleeder resistors in parallel.

3. The voltage balance circuit as claimed in claim 1, wherein the plurality of the batteries include a first battery and two second batteries, the plurality of the bleeder resistors include a first bleeder resistor and two second bleeder resistors, the plurality of the switches include a first switch and two second switches, the first switch is provided between the first bleeder resistor and the first battery, the first battery, the first bleeder resistor and the first switch are connected to form a switchable current division circuit loop, the first switch is connected to the analog front end component, each second switch is provided between one of the second bleeder resistors and one of the second batteries, each second switch is connected with the one of the second batteries and the one of the second bleeder resistors to form another switchable current division loop, and each second switch is connected to the analog front end component.

4. The voltage balance circuit as claimed in claim 3, wherein the voltage balance circuit has a first node, a second node, a third node, two fourth nodes opposite to the first node, two fifth nodes opposite to the second node, and two sixth nodes opposite to the third node, a negative electrode of the first battery is connected to the first node, the second node is connected between the first node and the first switch, and the third node is connected between the second node and the analog front end component, the first switch is connected to the third node.

5. The voltage balance circuit as claimed in claim 4, wherein the first switch is connected with the third node along an extension circuit.

6. The voltage balance circuit as claimed in claim 4, further comprising at least one first resistor connected between the second node and the third node.

7. The voltage balance circuit as claimed in claim 6, further comprising at least one second resistor provided between one fifth node and one sixth node.

8. The voltage balance circuit as claimed in claim 4, wherein a positive electrode of one of the second batteries is connected to the first node, one end of one of the second bleeder resistors is connected to the second node, and the other end of the one of the second bleeder resistors is connected to one of the second switches, a negative electrode of the one of the second batteries is connected with one fourth node, one fifth node is connected between the one fourth node and the one of the second switches, one sixth node is connected between the one fifth node and the analog front end component, the one sixth node is connected to the one of the second switches.

9. The voltage balance circuit as claimed in claim 8, wherein the sixth node is connected to the one of the second switches along an extension circuit.

10. The voltage balance circuit as claimed in claim 4, wherein a positive electrode of the newly added second battery different from the one of the second batteries is connected to one fourth node, the newly added second bleeder resistor different from the one of the second bleeder resistors is connected to one fifth node.

11. The voltage balance circuit as claimed in claim 1, wherein each switch is a MOSFET (Metal Oxide Semiconductor Field Effect Transistor) switch.

12. A voltage balance circuit, comprising:
a first battery;
at least one second battery connected with the first battery in series;
a first bleeder resistor, one end of the first bleeder resistor being connected to a positive electrode of the first battery;
at least one second bleeder resistor, one end of the at least one second bleeder resistor being connected to a positive electrode of the at least one second battery and a negative electrode of the first battery;
a first MOSFET (Metal Oxide Semiconductor Field Effect Transistor) switch, a drain electrode of the first MOSFET switch being connected to the other end of the first bleeder resistor, a source electrode of the first MOSFET switch being connected to the one end of the at least one second bleeder resistor;
at least one second MOSFET switch, a drain electrode of the at least one second MOSFET switch being connected to the other end of the at least one second bleeder resistor, and a source electrode of the at least one second MOSFET switch being connected to a negative electrode of the at least one second battery;
an analog front end component connected to a gate electrode of the first MOSFET switch and a gate electrode of the at least one second MOSFET switch, respectively;
a first thermistor arranged beside the first bleeder resistor;
a first fixation resistance connected to one end of the first thermistor;
at least one second thermistor arranged beside the at least one second bleeder resistor;
at least one second fixation resistance connected to one end of the at least one second thermistor; and
at least one micro-controller connected to the one end of the first thermistor and the one end of the second thermistor respectively, the micro-controller being connected to the analog front end component.

13. The voltage balance circuit as claimed in claim 12, wherein the first fixation resistance is interconnected with the source electrode of the first MOSFET switch and the gate electrode of the first MOSFET switch, the second fixation resistance is interconnected with the source electrode of the second MOSFET switch and the gate electrode of the second MOSFET switch.

14. The voltage balance circuit as claimed in claim 12, wherein the first battery is connected with the first bleeder resistor in parallel, the at least one second battery is connected with the at least one second bleeder resistor in parallel.

15. The voltage balance circuit as claimed in claim 12, wherein when one second battery, one second bleeder resistor and one second MOSFET switch are provided, the one second battery is connected with the one second bleeder resistor in parallel.

16. The voltage balance circuit as claimed in claim 12, wherein when one second battery, one second bleeder resistor and one second MOSFET switch are provided, the first MOSFET switch is provided between the first bleeder resistor and the first battery, the first battery, the first bleeder resistor and the first MOSFET switch are connected to form a switchable current division circuit loop, the one second MOSFET switch is provided between the one second bleeder resistor and the one second battery, the one second battery, the one second bleeder resistor and the one second MOSFET switch are connected to form another switchable current division loop.

17. The voltage balance circuit as claimed in claim 12, further comprising a plurality of batteries including the first battery and two second batteries, a plurality of bleeder resistors including the first bleeder resistor and two second bleeder resistors, and a plurality of switches including a first switch and two second switches, each second switch being the second MOSFET switch, each second battery being connected with the first battery in series, one end of the first bleeder resistor being connected to the positive electrode of the first battery, one end of each second bleeder resistor being connected to a positive electrode of one of the two second batteries and the negative electrode of the first battery, the other end of each second bleeder resistor being connected to a drain electrode of one of the two second MOSFET switches, and a negative electrode of each second battery being connected to a source electrode of the one of the two second MOSFET switches.

18. A method for balancing a charging voltage of a voltage balance circuit, a plurality of batteries of the voltage balance circuit starting being charged by use of the method for balancing the charging voltage of the voltage balance circuit, the method for balancing the charging voltage of the voltage balance circuit comprising steps of:
- detecting a voltage condition of each battery;
- sending an instruction signal to one switch connected to one battery of which a voltage is higher than the lowest present voltage;
- making the one switch and one bleeder resistor connected with the one battery in parallel be conductive, a partial voltage entering the one bleeder resistor, and the one bleeder resistor continuing heating up;
- continuously changing a resistance value of one thermistor arranged beside the one bleeder resistor due to a continuous temperature change of the one bleeder resistor;
- continuously calculating a temperature value of the one thermistor and continuously transmitting the temperature value of the one thermistor to an analog front end component of the voltage balance circuit;
- judging whether the temperature value of the one thermistor exceeds an upper temperature limit value set in the analog front end component, when the temperature value of the one thermistor exceeds the upper temperature limit value set in the analog front end component, the instruction signal being transmitted to the one switch to disconnect the one switch from the one bleeder resistor, and the one bleeder resistor starting cooling down;
- judging whether the temperature value of the one thermistor is lower than a lower temperature limit value set in the analog front end component, when the temperature value of the one thermistor is lower than the lower temperature limit value set in the analog front end component and the voltage of the one battery is higher than the lowest present voltage, the analog front end component transmitting the instruction signal to the one switch to make the one switch and the one bleeder resistor conductive, and the one bleeder resistor starting heating up;
- repeating judging whether the temperature value of the one thermistor exceeds the upper temperature limit value set in the analog front end component and judging whether the temperature value of the one thermistor is lower than the lower temperature limit value set in the analog front end component so as to make the one bleeder resistor start cooling down or heating up until the plurality of the batteries are fully charged; and
- finishing charging.

19. The method for balancing the charging voltage of the voltage balance circuit as claimed in claim 18, wherein when a step of judging whether the temperature value of the one thermistor is lower than the lower temperature limit value set in the analog front end component is executed, if the temperature value of the one thermistor is lower than the upper temperature limit value set in the analog front end component and the voltage of the one battery is equal to the lowest present voltage, the analog front end component will be without transmitting the instruction signal to the one switch to proceed with a conduction.

* * * * *